United States Patent [19]

Hering et al.

[11] Patent Number: 5,462,288
[45] Date of Patent: Oct. 31, 1995

[54] SHAFT SEAL ASSEMBLY

[75] Inventors: Jürgen Hering, Sievershütten; Rolf Johnen; Gerd Upper, both of Hoisdorf, all of Germany

[73] Assignee: Dichtungstechnik G. Bruss GmbH & Co. KG, Hoisdorf/Hamburg, Germany

[21] Appl. No.: 209,935

[22] Filed: Mar. 11, 1994

[30] Foreign Application Priority Data

Mar. 12, 1993 [EP] European Pat. Off. .............. 93104036

[51] Int. Cl.$^6$ ...................................................... F16J 15/32
[52] U.S. Cl. ............................. 277/37; 277/11; 277/152
[58] Field of Search .................................. 277/35, 37, 11, 277/152, 153, 134, 203, 181, 182

[56] References Cited

U.S. PATENT DOCUMENTS

| | | | |
|---|---|---|---|
| 4,484,751 | 11/1984 | Deuring | 277/153 |
| 4,928,980 | 5/1990 | Deuring | 277/153 |
| 5,123,661 | 6/1992 | Johnston et al. | 277/166 |
| 5,152,538 | 10/1992 | Mims | 277/153 |
| 5,178,243 | 1/1993 | Hamada et al. | 277/35 |
| 5,299,677 | 4/1994 | Caillaud et al. | 277/153 |
| 5,308,087 | 5/1994 | Schmitt | 277/142 |

FOREIGN PATENT DOCUMENTS

| | | |
|---|---|---|
| 0139503 | 10/1983 | European Pat. Off. . |
| 3634735 | 4/1988 | Germany . |

Primary Examiner—Daniel G. DePumpo
Attorney, Agent, or Firm—Lawrence J. Shurupoff

[57] ABSTRACT

A seal for sealing the end of a shaft passing out of the end wall of a casing and for sealing the end wall includes a gasket receptacle produced as a light metal pressure die casting. A sheet metal ring with a shaft seal ring molded onto it is pressed radially and axially into a recess in the die casting. The gasket receptacle is plastically deformed and the radial internal dimension of the sealing edge of the seal ring is set within the requisite narrow tolerance limits. A radially directed outer portion of the sheet metal ring is covered on both sides with elastomer.

3 Claims, 1 Drawing Sheet

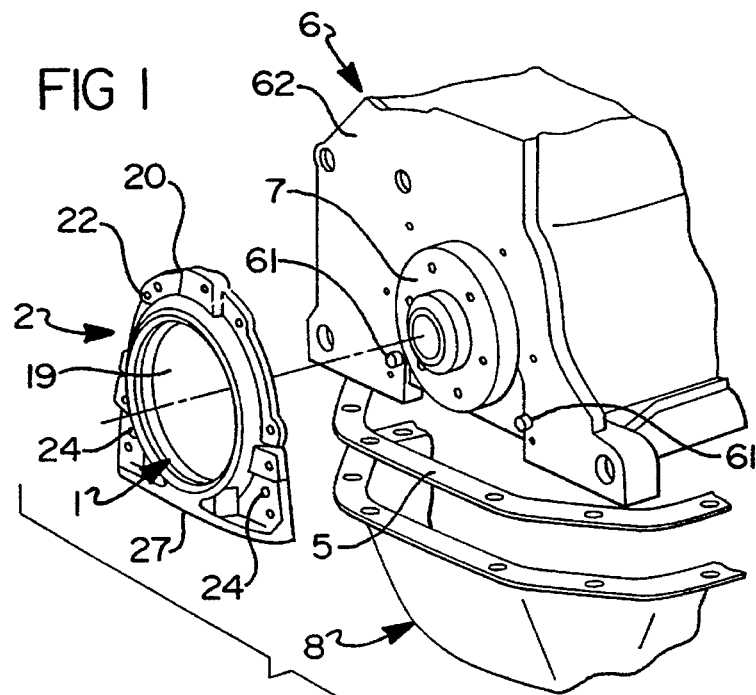
FIG 1
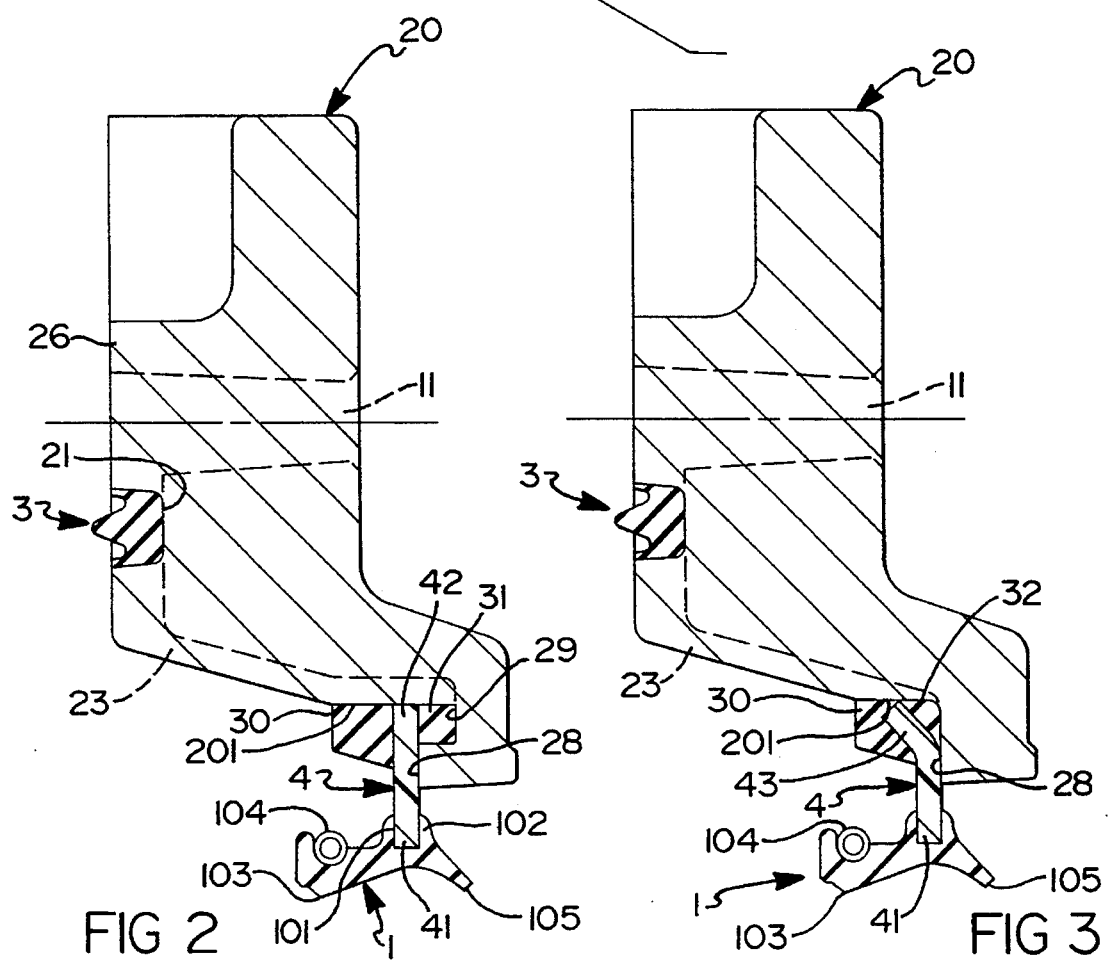
FIG 2
FIG 3

SHAFT SEAL ASSEMBLY

BACKGROUND OF THE INVENTION

1. Field of the Invention

The invention relates to a method for the manufacture of a shaft seal, as well as to the resulting shaft seal.

2. Description of the Prior Developments

In a known seal of this type (EP-A-139,503) firstly the shaft seal ring is shaped onto the radial flange of a cross-sectionally L-shaped sheet metal ring. For connection to a gasket receptacle, the outer, axially parallel portion of the ring is inserted in the cavity of an injection mould, so that in the case of the finished seal the outer portion of the sheet metal ring is received in a recess, in the form of an inner groove, of the gasket receptacle in the form of a plastic moulding and is fastened to the receptacle on both sides by elastomer material, which is also used for the static gasket and is linked therewith. The thus formed gasket module comprising the gasket receptacle with the shaft seal ring and the static gasket leads to a prefabricated, interchangeable unit. The described fastening by the axially parallel portion of the L-shaped sheet metal ring requires the shaping of the plastic gasket receptacle on the sheet metal ring, either before or after shaping the shaft seal ring on the inner portion of the sheet metal ring. The elastomer material injected on either side of the axially parallel portion ensures an elastic fastening. As a result of this design type the necessary limited radial tolerances for obtaining the coaxial nature of the sealing lip to the shaft are not always respected. Problems are also caused by the settling or creep of the plastic moulding under screw force, which can lead to leaks between the crankcase and the seal.

For the main use of the invention of the driven side crankshaft seal in motor vehicles, in which the crankshaft, the end wall of the crankcase and the crankcase wall perpendicular thereto are to be sealed with respect to the oil pan or sump, a seal with a light metal pressure die casting as the gasket receptacle has proven completely satisfactory. For the assembly of such a seal all the parts, namely the radial shaft seal ring, the pressure die casting, a flat gasket serving as a static gasket over the end wall of the crankcase, etc. are individually made available, which requires numerous working steps during assembly. This multipart solution leads to many error possibilities and in particular the possibility of damaging the individual components of the shaft seal. In this connection tests carried out by the applicant have revealed that shaft seals often have to be disposed of as waste due to damage in the sealing edge area of the shaft seal ring.

The object of the invention is to provide a method for the manufacture of a seal, in which the dynamic shaft seal ring and also the static gasket housed in a gasket receptacle are made available in the form of a prefabricated unit. Use is largely made of proven components and in particular the light metal pressure die casting for the reception of the gaskets. The aim is to render reusable the relatively expensive pressure die castings even in the case of a fault, particularly with respect to the shaft seal ring. Identical pressure die castings are to be rendered usable for different gasket modules for initial installation and for use as spares in after-sales service.

In a known concept, in which a shaft seal ring and a static gasket are shaped onto a gasket receptacle for forming a shaft seal with a single moulding tool (DE-C 3,634,735), in which the gasket receptacle is drawn from a metal sheet, the following difficulties are encountered which are prejudicial to prefabrication.

As the pressure die castings are not machined and are manufactured with the relatively large tolerances of the pressure die casting process, the moulding tool must be designed in such a way that there is a plastic deformation of the die casting carrier on the impression edges. In a second production attempt in the same moulding tool, the latter no longer brings about a satisfactory impression on the recovered carrier and overfilling takes place.

The requirement of shaping onto the die casting carrier the dynamic and the static gasket in the same moulding tool, makes such tools very expensive to manufacture and maintain, because the very much higher requirements made on the quality of the dynamic gasket, i.e. the shaft seal ring, define the costs.

The volume of the metal parts to be inserted in the tools has a disadvantageous influence on the manufacturing conditions and in particular on the time up to uniform heating to the moulding tool temperature.

In the known concept the higher technical requirements regarding the manufacture of the dynamic sealing edge determine the requirements on the die casting machine and the cycle time. Thus, the much more easily manufactured static gasket is necessarily produced with excessive expenditure.

The manufacture of the gasket according to the known concept requires high capital expenditure with respect to new and large die casting machines with a maximum precision high closing force, which must be suitable for the manufacture of radial shaft seal rings, whereas existing smaller die casting machines must be shut down for such radial shaft seal rings, because these products are substituted by the new gaskets.

A gasket system for a dynamic shaft seal not only comprises the sealing element, but also the antirotation face on the rotating surface. If such a seal fails due to leaks and has to be replaced, then nowadays for the replacement of radial shaft seal rings during the second installation the seal is pressed roughly 1 mm deeper into the casing bore. As a result comparable conditions to the initial installation are obtained, i.e. a new sealing lip on the new antirotation face of the shaft. However, this is only possible if for the initial installation and repair two different parts are manufactured, which require two different, relatively expensive pressue die cast parts and two different die casting tools.

The operating conditions generally require for the dynamic gasket a much more expensive elastomeric material (generally based on fluorine elastomer FPM) than for the static gasket. Particularly in the case of large gasket modules clear cost advantages would result from using different elastomeric materials for the static and the dynamic gaskets. However, this is not possible with the known concept.

SUMMARY OF THE INVENTION

The invention obviates the difficulties noted above with a shaft seal assembly as set forth below.

The invention leads to the following advantages:
- the relatively expensive pressure die casting is only processed with perfect dynamic shaft seal rings, which reduces wastage;
- the same pressure die casting can be used for shaft seal rings of different dimensions, both on initial installation and also on replacement or repair;

—both for the preassembly of the shaft seal ring on the sheet metal ring and for the moulding of the static gasket on the casting it is possible to use relatively simple moulding tools, as well as existing die casting machines;

—it is possible to use different elastomeric materials for the manufacture of the shaft seal ring on the one hand and the static gasket on the other;

—in the case of the invention for an after-sales construction only the much cheaper metal support and the moulding tool for the shaft seal ring have to be modified.

BRIEF DESCRIPTION OF THE DRAWINGS

The invention is described in greater detail hereinafter relative to non-limitative embodiments and the attached drawings, which show:

FIG. 1 an exploded representation of a shaft seal for the output end of a motor vehicle crankshaft and the end wall of the associated crankshaft casing.

FIG. 2 a partial section through a first construction of a seal according to the invention.

FIG. 3 a partial section through a second construction of a seal according to the invention.

DETAILED DESCRIPTION OF THE PREFERRED EMBODIMENTS

The exploded view of FIG. 1 shows the construction of a seal for the output end of a motor vehicle crankshaft. The seal 2 has as the gasket receptacle an aluminium pressure die casting 20 with a preassembled shaft seal ring 1 therein, as well as a passage opening 19 for the crankshaft 7, through holes 22 for screws for fixing to the end wall 62 of a crank casing 6, fitting holes 24 for receiving fitting pins 61, a casing side 26 not visible in FIG. 1 and an underside 27 perpendicular thereto and with which the gasket receptacle is pressed against the oil pan or sump gasket 5 of an oil sump or pan 8 fitted to the underside of the crankcase 6.

The axial partial sections of the completely assembled gasket receptacle 2 shown in FIGS. 2 and 3 reveal on a larger scale the construction of the seal in two alternatives, the same parts being given the same reference numerals.

The shaft seal ring 1 has a conventional construction with a sealing lip 103, which is pressed by a worm spring 104 onto the not shown crankshaft, as well as with a protective lip 105. By means of webs 101,102 the shaft seal ring 1 is vulcanized in a prefabrication stage to the inner portion 41 of a sheet metal ring 4 using a conventional moulding/injection moulding tool.

In a further stage the prefabricated shaft seal ring unit of the shaft seal ring 1 and the sheet metal ring 4 in a mould are pressed under radial and axial pressure in an axial recess 201 against a collar 28 of the pressure die casting 20 in such a way that the sealing edge 103 of the shaft seal ring is reproducibly held with the necessary close radial tolerance range. Above the collar 28 an undercut groove 29 is shaped into the die casting during the die casting process. On the casing side 26 in the pressure die casting 20 is shaped a groove 21 for receiving the static gasket 3 and a connecting channel 23 from said groove 21 to the undercut groove 29 of the back of the sheet metal ring 4 and to the area of the recess 201 on the front of the ring 4. It is also possible for several such connecting channels to emanate from the circular groove 21 surrounding the recess 201.

In a second moulding stage simultaneously the static gasket 3 and the rings 30,31 are moulded from elastomer material, which border the outer portion 42 of the sheet metal ring in the finished state of the seal 2 and fasten same to the casting.

The variant according to FIG. 3 differs in that the outer portion 43 of the sheet metal ring 4 is bent outwards from the collar 28 and there is in fact no undercut groove 29 above the collar 28. In fact, as a result of the bending of the outer portion 42 of the sheet metal ring 4 a ring duct 32 is formed for the reception of the elastomer material during the moulding of the static gasket 3. Otherwise, with regards to the manufacture, construction and arrangement of the seal, FIG. 3 is identical to FIG. 2.

We claim:

1. A seal assembly for sealing around a shaft which extends through an end wall of a casing and for sealing the end wall, the seal assembly comprising:

a cast metal gasket receptacle having a casing side, a groove formed in said casing side, a recess formed in said casing side and open toward said casing side, a connecting channel formed within said receptacle and extending between said groove and said recess, a collar located adjacent said recess, and a shaft passage opening located adjacent said recess;

a prefabricated shaft seal ring unit disposed adjacent the shaft passage opening and comprising a metal ring having an inner radial portion and an outer radial portion, an elastomeric seal ring bonded to said inner radial portion, and said outer radial portion engaging said collar of said gasket receptacle, said seal ring unit being axially and radially pressed within said recess and against said collar;

a static elastomeric gasket located in the groove on the casing side of said receptacle for sealing the end wall of said casing;

a first elastomeric ring bonded to one side of said outer radial portion of said metal ring adjacent said collar and a second elastomeric ring bonded to an opposed side of said outer radial portion of said elastomeric ring; and said first and second rings being axially spaced and interconnected by elastomeric material extending axially via said connecting channel over said outer radial portion of said metal ring and linked to said static gasket.

2. The seal according to claim 1, characterized in that the outer portion of the sheet metal ring is directed radially and that the ring of elastomer material on the side of the sheet metal ring remote from the casing is received in a circular groove undercutting the collar.

3. The seal according to claim 1, characterized in that the outer portion of the sheet metal ring is bent away from the collar, so that a circular groove is formed between the collar and the outer portion for shaping one of said elastomeric rings.

* * * * *